US011748586B2

United States Patent
Levine et al.

(10) Patent No.: US 11,748,586 B2
(45) Date of Patent: Sep. 5, 2023

(54) VIRTUAL AUTHENTICATION DETECTION

(71) Applicant: Berbix LLC, Incline Village, NV (US)

(72) Inventors: Eric Levine, San Francisco, CA (US); Stephen Kirkham, San Francisco, CA (US)

(73) Assignee: Berbix LLC, Incline Village, NV (US)

( * ) Notice: Subject to any disclaimer, the term of this patent is extended or adjusted under 35 U.S.C. 154(b) by 14 days.

(21) Appl. No.: 17/625,725

(22) PCT Filed: Jun. 16, 2020

(86) PCT No.: PCT/US2020/037887
§ 371 (c)(1),
(2) Date: Jan. 7, 2022

(87) PCT Pub. No.: WO2021/007000
PCT Pub. Date: Jan. 14, 2021

(65) Prior Publication Data
US 2022/0284207 A1 Sep. 8, 2022

Related U.S. Application Data

(60) Provisional application No. 62/872,163, filed on Jul. 9, 2019.

(51) Int. Cl.
*G06K 7/14* (2006.01)
(52) U.S. Cl.
CPC ................... *G06K 7/1413* (2013.01)
(58) Field of Classification Search
CPC ...... G06K 7/1413; G06K 7/14; G06K 7/1417; G06K 7/00; G06K 7/1404
USPC ................... 235/462.01, 454, 375
See application file for complete search history.

(56) References Cited

U.S. PATENT DOCUMENTS

| | | | |
|---|---|---|---|
| 2002/0013794 A1 | 1/2002 | Carro et al. | |
| 2006/0022059 A1* | 2/2006 | Juds ................. | G06K 19/06056 235/494 |
| 2007/0175974 A1* | 8/2007 | Self ........................ | G06Q 30/06 235/375 |
| 2015/0089615 A1* | 3/2015 | Krawczyk ............... | G06F 21/31 726/7 |
| 2015/0278753 A1* | 10/2015 | Hookom .............. | G06K 7/1443 235/385 |
| 2018/0107887 A1 | 4/2018 | Huber, Jr. et al. | |
| 2019/0070887 A1 | 3/2019 | Peters et al. | |

(Continued)

OTHER PUBLICATIONS

International Search Report in PCT Application No. PCT/US2020/037887, dated Sep. 2, 2020.

*Primary Examiner* — Edwyn Labaze
(74) *Attorney, Agent, or Firm* — Charles B. Lobsenz; Brian H. Buck; Potomac Law Group, PLLC

(57) ABSTRACT

Methods, systems, and devices are provided for authentication system configured to authenticate a document. According to one aspect, the system can receive image capture data including one or more virtual images of the document. The system can detect one or more identification indicators in the one or more virtual images. The system can detect one or more authentication indicators in the one or more virtual images. And the system can detect whether the document is authentic based on a result including analyzing the one or more identification indicators and analyzing the one or more authentication indicators.

21 Claims, 6 Drawing Sheets

(56) References Cited

U.S. PATENT DOCUMENTS

2020/0273048 A1* 8/2020 Andon ............... G06Q 20/045
2022/0067984 A1* 3/2022 Choi .................... A63F 13/213

* cited by examiner

500

DAIRICHMOND$^L_F$

DAJVA$^L_F$

DAK232690000$^L_F$

DCF|2424244747474786102204|$^L_F$ — Logic Field 506

DCGUSA$^L_F$

DCK|123456789|$^L_F$ — Logic Field 506

DDA|F|$^L_F$ — Standards Field 502

DDB|06062008|$^L_F$

DDC06062009$^L_F$ — Standards Field 502

DDD1$^C_R$

ZVZVA01$^C_R$

*FIG. 5B*

VIRTUAL AUTHENTICATION DETECTION

CROSS-REFERENCE TO RELATED APPLICATIONS

This application is a 371 U.S. National Stage application of International Application No. PCT/US2020/037887, filed on Jun. 16, 2020, which claims the benefit of U.S. Provisional Patent Application No. 62/872,163, filed on Jul. 9, 2019, the contents of which are incorporated herein by reference in their entirety.

BACKGROUND

Much of the current methods used to detect and protect against fraudulent identification is conducted by means of physical security features. That is, a document issued for the purpose of authentication or identification by an issuing authority will likely follow guidelines for having certain physical security features. For example, a state-issued driver's license will include physical security features that are specific and compliant with the state guidelines, or other standards organizations, or both. For physical identification documents, the security features can include having specific body design, production process, having certain types of ink used to print the identification document, etc.

While these physical cards can improve security by having a trained person or machine identify these features for authenticity by a physical inspection, virtual inspection of an ID is generally limited to physical security features that are visible through the collection of multiple still images or a short video. However, it is difficult to discriminate tactile features from a photograph of a physical ID card. Thus, currently, a virtual ID check is inherently less confident than a physical ID check.

BRIEF SUMMARY

The present disclosure relates generally to systems and methods for authenticating documents and images. In one aspect, an authentication system can be configured to authenticate documents. According to one aspect, the system can receive image capture data including one or more virtual images of the document. The system can detect one or more identification indicators in the one or more virtual images. The system can detect one or more authentication indicators in the one or more virtual images. And the system can detect whether the document is authentic based on a result including analyzing the one or more identification indicators and analyzing the one or more authentication indicators.

In one aspect, the system can determine whether at least one of the one or more authentication indicators is inauthentic based on analyzing the one or more identification indicators. In one aspect, the system can determine whether at least one of the one or more identification indicators is inauthentic based on analyzing the one or more identification indicators and analyzing the one or more authentication indicator.

In one aspect, the detection of one or more identification indicators in the one or more virtual images can further include decoding an identification code in the one or more virtual images. In one aspect, the identification code can be a barcode. In one aspect, the system can analyze a data payload from the decoding the identification code in the one or more virtual images.

In one aspect, the system can decode an identification code in the one or more virtual images. In one aspect, the identification code can be a barcode. In one aspect, the system can analyze a data payload from the decoding the identification code in the one or more virtual images. In one aspect, the system can analyze one or more authentication fields in the data payload associated with the one or more virtual images.

In one aspect, the system can compare one or more authentication fields within the data payload with at least one authentication field associated with a data payload of a second document, the second document having been authenticated.

In one aspect, the system can analyze a date of issue field associated with the data payload. In one aspect, the system can analyze the sequence of the one or more authentication fields in the data payload. In one aspect, the system can analyze the order of the one or more authentication fields in the data payload. In one aspect, the system can analyze a spacing of one or more authentication fields in the data payload. In one aspect, the system can determine whether a rule-based assertion is present within an authentication field, comparing a plurality of authentication fields within the data payload, or a combination thereof.

In one aspect, the system can generate a machine learning model comprising a data set of information associated with authenticated documents. In one aspect, the information of the data set comprises identification indicators and authenticating indicators, each associated with authenticated documents.

In one aspect, the document can be a personal identification document. In one aspect, the image capture data can be received via an image capture device.

And in one aspect, the system can determine that the document is fraudulent based on the identification indicators and authentication indicators.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described with reference to the following figures.

FIGS. 5A-5B illustrate diagrams of a system authenticating a document and displaying the results.

DETAILED DESCRIPTION

Figure 1:
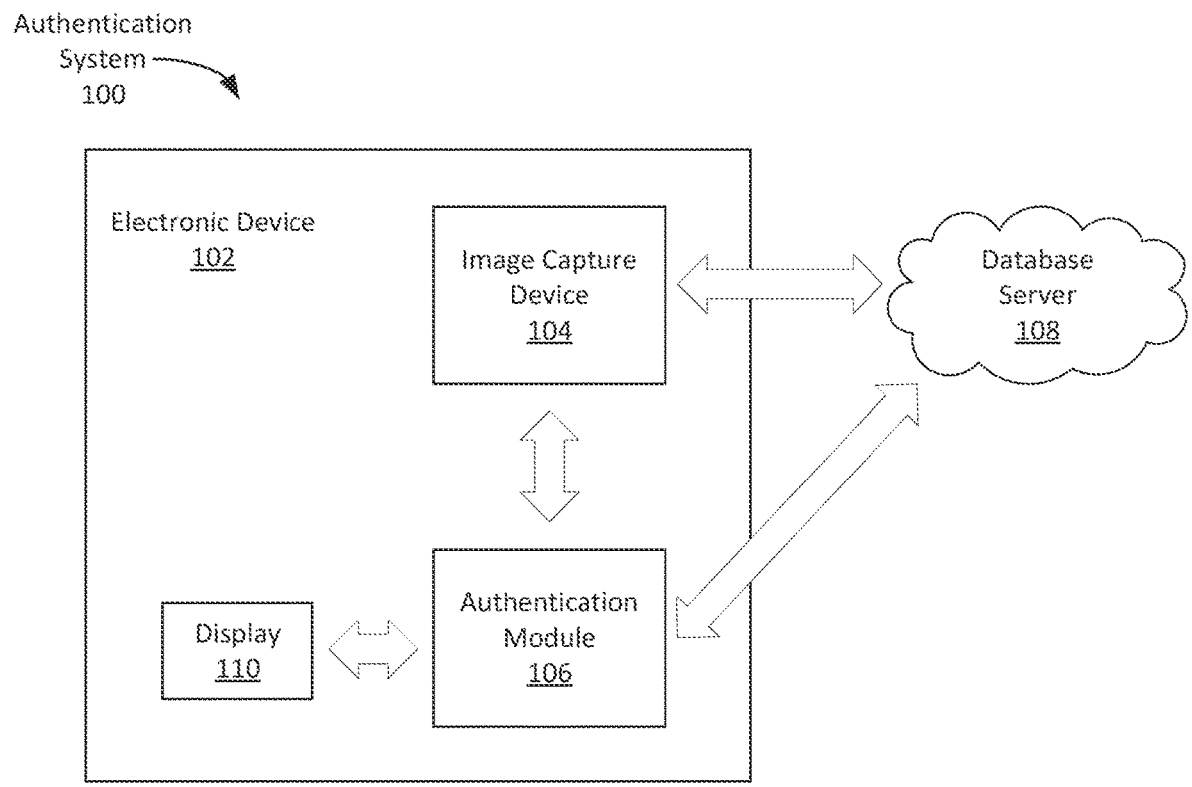
FIG. 1 is a schematic illustration of a computer system for authenticating a document.

According to certain embodiments, methods and systems disclosed herein relate to a schedule generator.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this exemplary patent can be performed in different orders than the order presented in this specification. Furthermore, some steps of the exemplary system and method may be performed in parallel rather than being performed sequentially.

A computer implemented system and method for authenticating a document is described.

Typically, an authenticating document for the purposes of identification, such as an ID card, can have a computer code imprinted on at least one facing page of the document. For example, the code can be a bar code, a QR code, a PDF417 compliant code, etc. The standards can be set by a standards organization that issue guidelines to help differentiate between different identification issuers. The standards can also be set by the issuing organization, such as a state that issues identification cards including driver's licenses.

For example, a standards organization for issuing ID cards can set a guideline or rule including a provision that requires all states to issue a driver's license with a compliant barcode. The state issuing the identification documents will issue ID cards embedded with a barcode unique to the particular ID card with information about the person identified in the ID card. The barcode will likely comply with a particular barcode format such as the PDF417 barcode format.

In one example, the authentication system can receive an image of an identification document. The authentication system can detect and recognize that the identification document incudes a barcode. The authentication system can then decode the barcode and analyze a data payload associated with the barcode. The data payload associated with the barcode can include strings of text and numbers associated with the barcode having various fields including authentication information and personal identification information.

In one example, the authentication system can determine, based on analyzing the barcode embedded in an identification document, various encoding methods used by the particular issuing authority. When the authentication system identifies that a particular encoding used in a given identification document is deviated from encoding used in a known authentic identification document, the authentication system can determine that the given identification document is counterfeit or inauthentic.

In one aspect, a system and method for detecting counterfeit, or fake, identification documents by virtual inspection of the identification document is described. In one example, the identification document can be an identification document issued by a state such as a driver's license issued by a particular state.

A. Authentication System

An authentication system for detecting counterfeit or inauthentic identification documents is described below.

FIG. 1 illustrates a system architecture of a computer implemented system for detecting and authenticating a document. As illustrated in FIG. 1, an authentication system 100 includes an electronic device 102 having image capture device 104, an authentication module 106, and a display 110. The electronic device 102 can send and receive image information and authentication information of documents via the image capture device 104 and authentication module 106 to a remove server, or database server 108 configured to store image information and authentication information. In one example, the authentication information can be stored internally in the electronic device 102. In one example, the electronic device 102 can be a mobile device such as a smart phone or a computer tablet. In one example, the electronic device can be any electronic device that can be interacted with a person such as a laptop or computer.

In one example, the image capture device 104 can be a camera configured to capture images with resolutions high enough to read information on a physical identification card. For example, the camera and capture images from an ID card with high enough resolution to read any barcode, text, designs, or symbols on an ID card. In one example, the information in the image captured can include an image of a signature associated with the identified person in the identification document. The information in the image captured can include a barcode presented in a format compliant with guidelines set by the issuing authority, or standards organization, or both. In one example, the information in the image captured can include a date of birth or address associated with the identified person in the identification document.

In one example, the authentication module 106 of the electronic device can analyze any barcode detected in the image captured by the image capture device 104. The authentication module 106 can decode the barcode and generate a data payload associated with the barcode of the identification document. The authentication module 106 can then analyze the data payload and identify information in the payload associated with identification information and authentication information. For example, identification information can include personal information such as a date of birth, address of residence, and date of issuance of the identification document. The identification information can be stored in the data payload. In one example, the authentication information can include information related to identifying the issuing authority having a specific code either represented by a series of number, or letters, or both. The authentication information can also be associated with mathematically logical connections between a series of text or numbers with another series of text or numbers. In one example, the authentication information can be associated with spacing, sequencing, ordering, or a combination thereof of the information presented in the data payload.

Figure 2:
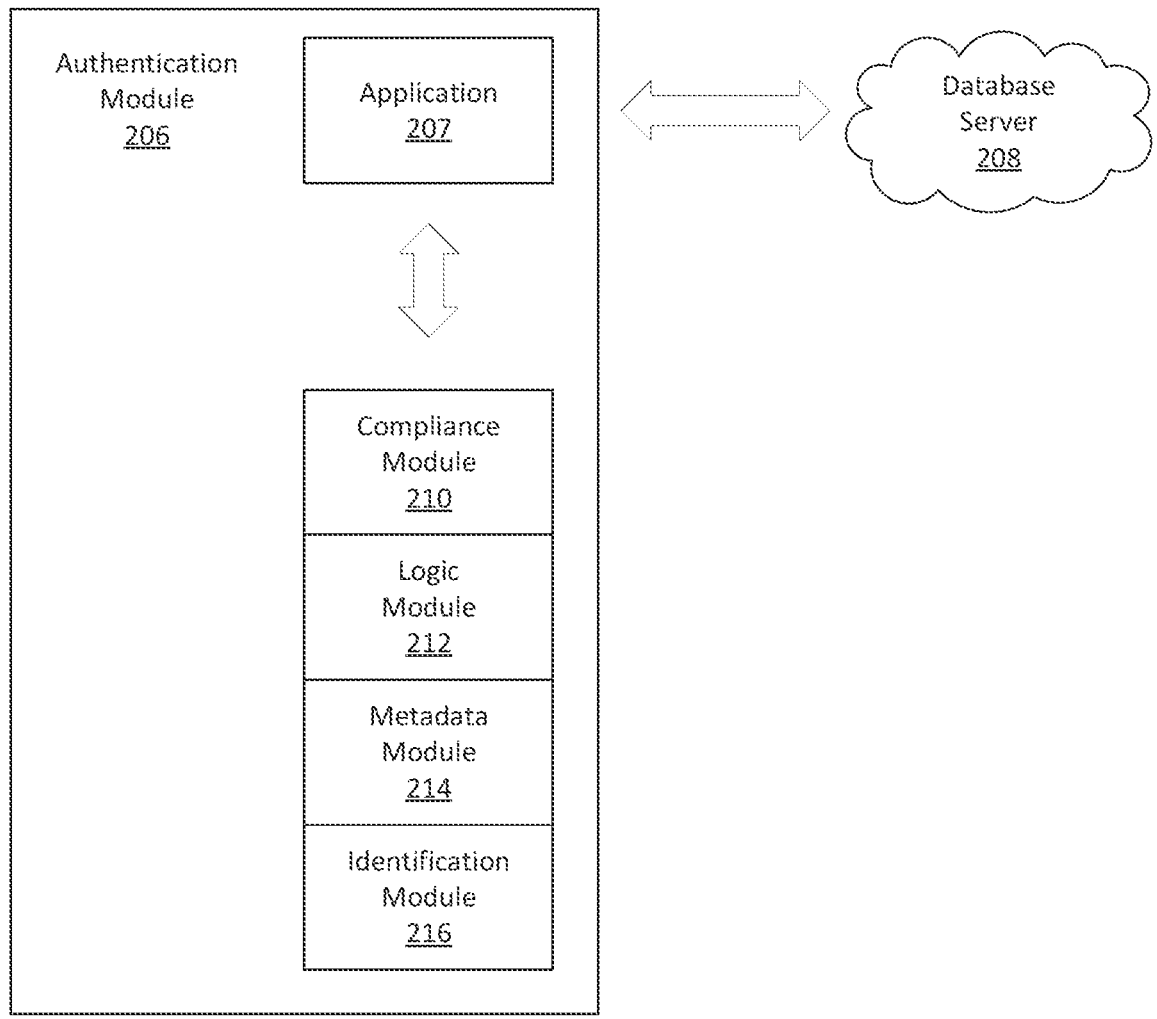
FIG. 2 shows an additional schematic illustration of the computer system for authenticating a document according to FIG. 1.

FIG. 2 illustrates an example authentication module 106 of FIG. 1 in more detail. As illustrated in FIG. 2, authentication module 206 includes an application 207. The authentication module 206 can determine anomalies, outliers of information in a payload of a given identification document and detect counterfeit or inauthentic documents based on the payloads of the documents via a compliance module 210, a logic module 212, a metadata module 214, and an identification module 216.

In one example, the compliance module 210 can detect whether the payload indicates the proper format and uses the correct identification codes of the issuing authority that issued the identification document. For example, if the application 207 via the compliance module 210 detects that a particular string of text or numbers is supposed to identify the identity of the issuing authority is different from the identified string of text, the authentication module 206 can determine that the identification document processed is inauthentic. In one example, the logic module 212 can detect multiple strings of text or numbers in a given payload, such that the multiple strings of text or numbers have a logical connection. For example, if the application 207 via the logic module detects that there is no logical relationship between a set of strings of numbers where there would be a logical relationship between a set of strings of numbers in an authentic document, the authentication module 206 can determine that the identification document processed is inauthentic. In one example, the application 207 can communicate, send, and receive authentication and identification information from a database server 208 to compare authentication fields detected in a data payload of a given identification document with authentication fields verified as authentic of a different identification document of the same issuing authority. In one example, the database server 208 can contain information payloads of hundreds and thousands of verified and authenticated identification documents.

In one example, the metadata module 214 can detect whether strings of letters or numbers relates to metadata and if the metadata is correct. For example, if the application 207 via the metadata module 214 determines that a particular string of text or numbers in a given payload describes a reissue date of a license, the reissue date detected must be presented in a format compliant with a date and the date must not conflict with a different reissue date or the original issue date. Otherwise, the authentication module 206 can determine that the given identification document is inauthentic. For example, if the reissue date describes a date earlier than that of the original issue date, the authentication module 206 can automatically determine that the payload is associated with inauthentic information.

In one example, the identification module 206 can detect whether personal information revealed in the data payload of a given identification module is identical to that of any text related to personal information embedded and the captured image. For example, the identification module 206 can detect an address in the data payload and will compare the address to the address detected on the face of the identification card. If the authentication module 206 determines that the information compared are different, the authentication module can determine that the authentication document is inauthentic.

In one example, based on a dataset of multiple authenticated payloads provided and stored in the database server 208, the authentication system 100 can automatically detect correlations such that a deviation from the correlation can be flagged as having an inauthentic document.

In one example, the electronic device can display the data payload with information regarding any anomalies or potential counterfeit information detected to a user via the display 110. The electronic device can display the data payload itself or an assessment of the authenticity of a given identification document via an image captured by the image capture device 104.

Figure 3:
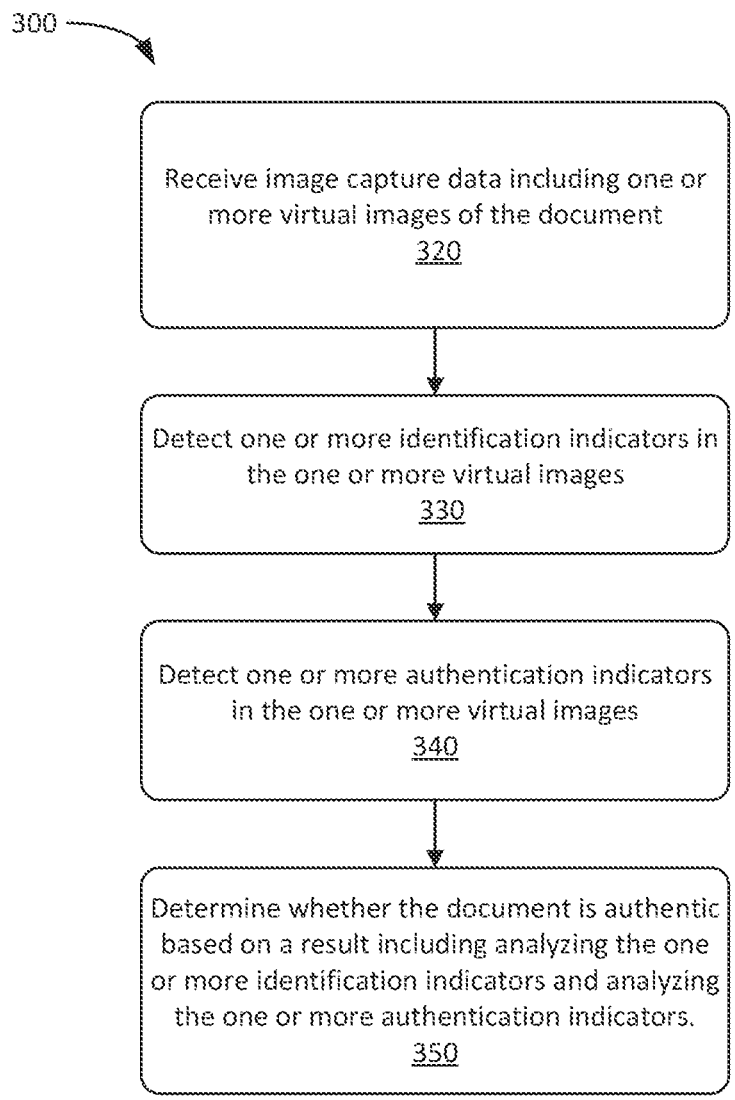
FIG. 3 illustrates a flow chart of an example process for authenticating a document in accordance with various aspects of the subject technology.
Figure 4:
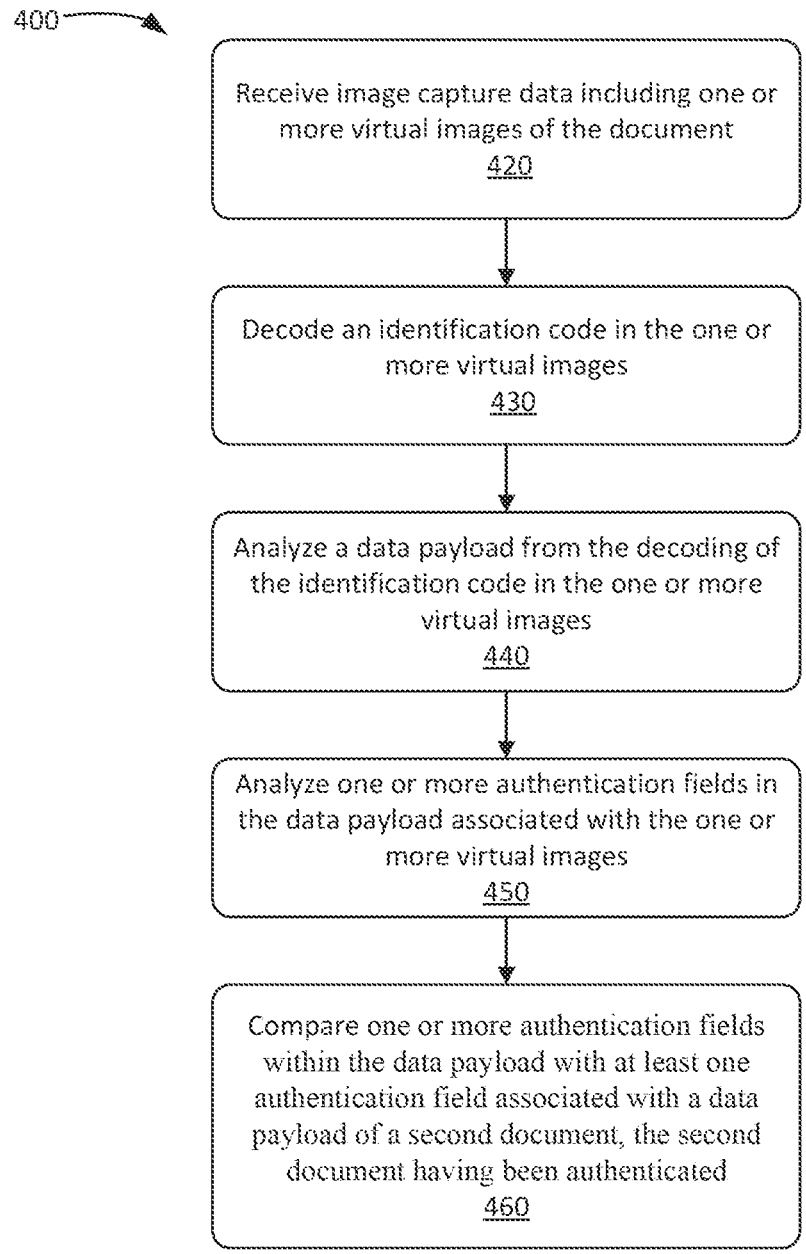
FIG. 4 illustrates an additional flow chart of an example process for authenticating a document in accordance with various aspects of the subject technology.

FIGS. 3-4 depicts flow diagrams of example processes for authenticating a document.

In the example flow diagram 300 of FIG. 3, at block 320, a computer-implemented system can receive image capture data including one or more virtual images of the document. At block 330, the system can detect one or more identification indicators in the one or more virtual images. The identification indicators can be associated with personal information of the person identified by the identification document. At block 340, the system can detect one or more authentication indicators in the one or more virtual images. The authentication indicators can be associated with various authentication fields associated with the identification document. At block 350, the system can determine whether the document is authentic based on a result including analyzing the one or more identification indicators and analyzing the one or more authentication indicators.

In the example flow diagram 400 of FIG. 4, at block 420, the system can receive image capture data including one or more virtual images of the document. At block 430, the system can decode an identification code in the one or more virtual images. At block 440, the system can analyze a data payload from the decoding of the identification code in the one or more virtual images. At block 450, the system can analyze one or more authentication fields in the data payload associated with the one or more virtual images. At block 460, the system can compare one or more authentication fields within the data payload with at least one authentication field associated with a data payload of a second document, the second document having been authenticated.

B. Payload Analysis

The following example illustrates an authentication system analyzing a data payload associated with an identification document.

A bad actor can decode a barcode, revealing the same decoded text as that of the image capture device and decoder of the authentication system 100. In some cases, the bad actor can recognize which numbers, texts, or strings, relate to identification information, such as date of birth, address of residence, etc., and manually edit them to then generate a barcode.

However, bad actors often cannot determine what other letters, numbers, and strings mean, and instead choose arbitrary letters, numbers, and strings. The current system can determine whether the numbers are arbitrary, and if they are arbitrary, whether the arbitrary number, or letters, was intentionally set because the numbers were made by an issuing authority, or if it was done by a bad actor who did not know the rules that the issuing authority were following that set the arbitrary numbers.

The following example describes a specific example of an authentication system analyzing a data payload associated with an identification document to determine the authenticity of the identification document.

Figure 5A:
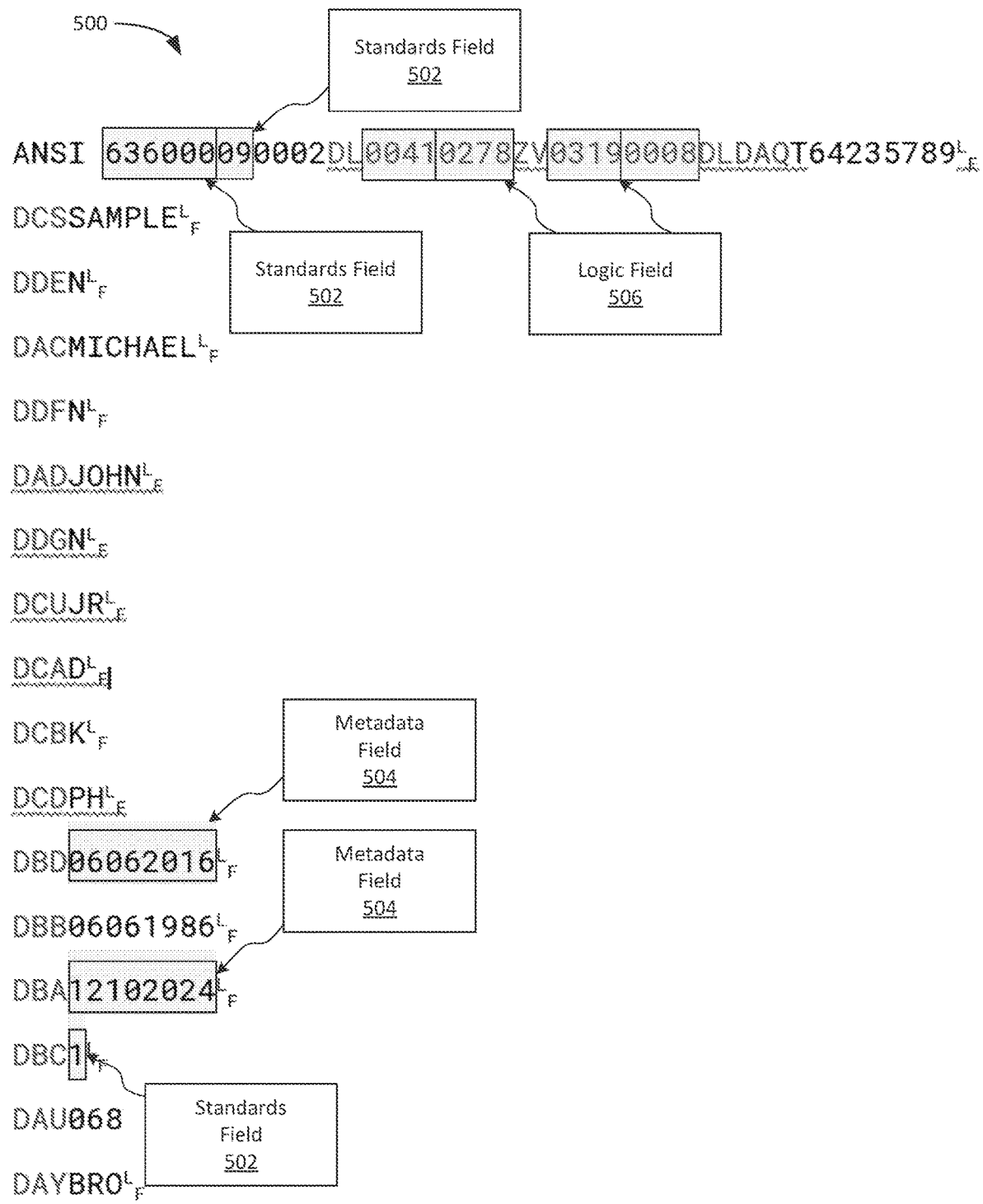

FIGS. 5A-5B illustrate an example payload having a plurality of authentication and identification fields used to determine whether a given detected payload is authentic or inauthentic.

As illustrated in FIG. 5A, a data payload 500 is presented and analyzed by an authentication system. The data payload 500 can be generated by decoding a barcode associated with an identification document, the payload having various information related to personal information associated with the identification document and authentication information associated with the identification document.

For example, a standards field 502 can be a 6-digit number that uniquely identifies the authority that issued the identification. For example, generally for motor vehicle licenses, the American Associate of Motor Vehicle Administrators ("AAMVA") sets standards for identification and license issuers, such as state department of motor vehicles, including how the indentation issuers such as states can identify themselves. For example, the AAMVA can issue a unique code for the state of California and a different code for the state of Virginia. In one example, the code can be an Issuer Identification Code ("IIN") and the code can be a 6-digit number.

In one example, the payload of an authenticating document, such as a driver's license will need to have an IIN embedded in the barcode and revealed once the barcode payload is generated. In one aspect of the invention, the authentication system can identify that the payload of a particular authenticating document or fraudulent or counterfeit authenticating document requires an IIN. This can be done by determining that the IIN needs to be located at a specific portion of the payload, such as the beginning numbers of the payload. In one example, the authentication system can determine the specific state based on the IIN detected. In this example, as illustrated in FIG. 5A, the IIN is labelled "636000" which is the number associated with the state of Virginia, USA. The authentication system can reference the number with the list of compliant numbers associated with each state issuing driver's licenses, and if the number detected does not comply with the number associated with Virginia, or any other state, the authentication system can determine that the data payload contains fraudulent or inauthentic information.

In one example, a standards field 502 can include information related to which standards the barcode is currently compliant with. For example, if there have been eight additional revisions to the original standards published, a number "09" can correctly indicate the current revision. A number that is not "09" in this case can be detected by the authentication system. The authentication system can compare this particular standards field 502 with the same standards fields of different identification documents of the same issuing authority that have been authenticated. In this case, the authentication system would know that "09" is the correct number for this particular field and any deviation from the particular digits would indicate an inauthentic payload.

In one example, the data payload of an identification document will contain a logic field 506 for the purpose of properly preventing fraud. In one example, the logic field will include a set of strings of numbers such that a string of numbers will have a logical relationship with another string of numbers or strings of numbers. For example, as illustrated in FIG. 5A, The logic field 506 include two four-digit strings. The strings read "0041" and "0278". The strings of digits next to the two four-digit strings read "0319" and "0008". In this particular example, the digits 0041 and 0278 represent arbitrary whole number. And the digits 0319 represent the mathematical sum of the whole numbers represented by digits 0041 and 0278. And the digits 0008 represent the total length in bytes. The authentication system can detect that there are a set or series of strings of text or numbers that have a logical connection among the strings. The logical connections can be determined and trained based on a data set of authenticated payloads identification documents associated with the same issuing authority. The authentication system, when analyzing, a given payload predict that values in certain fields of the payload will represent logical relationships with other fields based on the detecting of the same relationships in previously authenticated documents. If the given payload does not reveal that the values in the same fields of the given payload have the same logical relationship as that of authenticated payloads, then the authentication system can flag the payload as having inauthentic information.

In one example, the data payload can include metadata fields 504 indicating, for example, a date associated with the issue date or version of the identification document. For example, the authentication system can detect an address in the data payload and will compare the address to the address detected on the face of the identification card. In another example, the authentication system can detect a date of issuance. In this example, a string of numbers detected in metadata field 504 is "06062016" which can represent an issuance date of Jun. 6, 2016. If authentication system detects that the information compared to the issuance date detected on the front of the physical ID card are different, the authentication system can determine that the identification document is inauthentic. In one example, the metadata field can indicate the date of expiration of the card.

In one example, a standards field 502 can indicate a specific code identifying the person identified in the document. For example, the specific code can be a code that indicates the gender of the person identified in the document. In one example, the code, determined by the issuing authority, or a standards organization, can be a number "1" for male, a number "2" for female, and a number "9" for unspecified. If the number is fraudulently changed such that the number does not match the indication on the face of the physical card, or if the number is none of "1", "2", or "9" in this particular example, then the authentication system can determine that the data payload is associated with an inauthentic document.

In one example, as illustrated in FIG. 5B, various logic fields 502 can indicate an algorithmic relationship to one or more other fields in the same payload. Other portions of the logic field 502 can define enumerable or sequential properties about the ID such as when or where it was issued. These algorithmic, sequential, or enumerable properties can vary by state but follow predictable patterns that a state will have when attempting to issue documents that comply with certain standard organizational guidelines.

In one example, a machine learning module can be generated by the authentication system to better identify patterns and determine outliers and potential inauthentic fields of a given data payload compared to a training data set of authentic payloads and inauthentic payloads with better confidence and accuracy.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A computer-implemented method of authenticating a document, the method comprising:
    receiving image capture data including one or more virtual images of the document;
    detecting one or more identification indicators in the one or more virtual images;
    detecting one or more authentication indicators in the one or more virtual images; and
    determining whether the document is authentic based on a result comprising:
        analyzing the one or more identification indicators; and
        analyzing the one or more authentication indicators to verify compliance with a predeterminded syntax through which the one or more identification indicators are expressed by the one or more authentication indicators included by the document.

2. The method of claim 1 further comprising determining whether at least one of the one or more authentication indicators is inauthentic based on analyzing the one or more identification indicators.

3. The method of claim 1 further comprising determining whether at least one of the one or more identification indicators is inauthentic based on analyzing the one or more identification indicators and analyzing the one or more authentication indicators.

4. The method of claim 1 wherein the detecting one or more identification indicators in the one or more virtual images further comprises decoding an identification code in the one or more virtual images.

5. The method of claim 4 wherein the identification code is a barcode.

6. The method of claim 4 wherein the analyzing the one or more identification indicators comprises analyzing a data payload from the decoding the identification code in the one or more virtual images.

7. The method of claim 1 wherein the detecting the one or more authentication indicators in the one or more virtual images further comprises decoding an identification code in the one or more virtual images.

8. The method of claim 7 wherein the identification code is a barcode.

9. The method of claim 7 wherein the analyzing the one or more authentication indicators comprises analyzing a data payload from the decoding the identification code in the one or more virtual images.

10. The method of claim 9 wherein the analyzing the data payload includes analyzing one or more authentication fields in the data payload associated with the one or more virtual images.

11. The method of claim 10 further comprising comparing the one or more authentication fields within the data payload associated with the one or more virtual images with at least one authentication field associated with a data payload of a second document, the second document having been authenticated.

12. The method of claim 11 wherein the analyzing the one or more authentication indicators comprises analyzing a date of issue field associated with the data payload associated with the one or more virtual images.

13. The method of claim 11 wherein the analyzing the one or more authentication indicators comprises analyzing a sequence of the one or more authentication fields in the data payload associated with the one or more virtual images.

14. The method of claim 11 wherein the analyzing the one or more authentication indicators comprises analyzing an order of the one or more authentication fields in the data payload associated with the one or more virtual images.

15. The method of claim 11 wherein the analyzing the one or more authentication indicators comprises analyzing a spacing of one or more authentication fields in the data payload associated with the one or more virtual images.

16. The method of claim 11 wherein the analyzing the one or more authentication indicators comprises (a) determining whether a rule-based assertion is present within an authentication field within the data payload associated with the one or more virtual images and/or (b) comparing a plurality of authentication fields within the data payload associated with the one or more virtual images.

17. The method of claim 1 wherein the result is based on generating a machine learning model comprising a data set of information associated with authenticated documents.

18. The method of claim 17 wherein the information of the data set comprises identification indicators and authenticating indicators, each associated with authenticated documents.

19. The method of claim 1 wherein the document is a personal identification document.

20. The method of claim 1 wherein the image capture data is received via an image capture device.

21. The method of claim 1 further comprising determining that the document is fraudulent based on the identification indicators and authentication indicators.

* * * * *